(12) United States Patent
Straley et al.

(10) Patent No.: US 8,108,485 B1
(45) Date of Patent: Jan. 31, 2012

(54) METHOD AND SYSTEM FOR OPERATING A COMMUNICATION SYSTEM

(75) Inventors: Jay Cee Straley, Pleasant Hill, CA (US); Kosol Jintaseranee, Sunnyvale, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 303 days.

(21) Appl. No.: 12/337,523

(22) Filed: Dec. 17, 2008

(51) Int. Cl.
*G06F 15/16* (2006.01)
*G06F 15/167* (2006.01)

(52) U.S. Cl. ......... 709/217; 709/213; 709/229; 709/231

(58) Field of Classification Search .................... 709/217
See application file for complete search history.

(56) References Cited

U.S. PATENT DOCUMENTS

| | | | | | |
|---|---|---|---|---|---|
| 6,167,438 | A | * | 12/2000 | Yates et al. ..................... | 709/216 |
| 7,016,883 | B2 | | 3/2006 | Dispensa et al. | |
| 7,139,811 | B2 | * | 11/2006 | Lev Ran et al. ............... | 709/217 |
| 2002/0049760 | A1 | * | 4/2002 | Scott et al. ...................... | 707/10 |
| 2003/0061287 | A1 | * | 3/2003 | Yu et al. ........................ | 709/205 |
| 2004/0148434 | A1 | * | 7/2004 | Matsubara et al. ........... | 709/246 |
| 2004/0199604 | A1 | * | 10/2004 | Dobbins et al. ............... | 709/217 |
| 2005/0180418 | A1 | * | 8/2005 | Andersen et al. .............. | 370/389 |
| 2007/0022174 | A1 | * | 1/2007 | Issa ................................ | 709/217 |
| 2007/0094279 | A1 | | 4/2007 | Mittal et al. | |
| 2007/0174471 | A1 | * | 7/2007 | Van Rossum ................. | 709/229 |
| 2008/0059656 | A1 | * | 3/2008 | Saliba et al. ................... | 709/248 |
| 2008/0120416 | A1 | | 5/2008 | Hopkins et al. | |
| 2008/0126785 | A1 | | 5/2008 | Chong et al. | |
| 2008/0147821 | A1 | * | 6/2008 | Dietrich et al. ............... | 709/216 |
| 2008/0235391 | A1 | * | 9/2008 | Painter et al. ................. | 709/232 |
| 2008/0270524 | A1 | * | 10/2008 | Gupta et al. ................... | 709/203 |

\* cited by examiner

*Primary Examiner* — Moustafa M Meky
*Assistant Examiner* — Blake Rubin (57) ABSTRACT

A method of operating a communication server system is provided. The method includes monitoring communications exchanged between a first communication device and a second communication device for a transmission of data from the first communication device to the second communication device, and in response to detecting the transmission of the data, storing a copy of the data. The method further includes receiving a request for the data from a third communication device, and in response to the request, transmitting the data to the third communication device. The method also includes receiving a download credit from the third communication device in response to transmitting the data to the third communication device, and transmitting the download credit to the first communication device.

14 Claims, 6 Drawing Sheets

METHOD AND SYSTEM FOR OPERATING A COMMUNICATION SYSTEM

TECHNICAL BACKGROUND

One of the most common uses of the Internet is the transfer and exchange of data files. These files may contain text, images, music, video, or the like. In response to the demand for easy transfer of large data files, a number of different methodologies have been developed. These methodologies include file transfer protocol (FTP), torrents, peer-to-peer (P2P), and the like. While these methodologies simplify the upload and download of large data files, the bandwidth required for the transfer remains unchanged.

Large files require large amounts of bandwidth for fast transfers. Bandwidth limitations are particularly important in lower speed networks. For example, a user may be connected to the Internet through a local area network (LAN) and a gateway. Wireless communication networks where a user connects to the internet through a wireless communication device, wireless base station, and a gateway also have bandwidth limitations. While the link between the gateway and the Internet may have a very large bandwidth, users will be limited by the available bandwidth of the LAN or the wireless network. In response to this limitation, some systems include functionality in the gateway or other server system to cache large files uploaded by the user. This allows subsequent requests for the file received over the Internet to be serviced by the server system having a large bandwidth to the Internet instead of the user system over the lower bandwidth LAN.

OVERVIEW

A method of operating a communication server system is provided. The method includes monitoring communications exchanged between a first communication device and a second communication device for a transmission of data from the first communication device to the second communication device, and in response to detecting the transmission of the data, storing a copy of the data. The method further includes receiving a request for the data from a third communication device, and in response to the request, transmitting the data to the third communication device. The method also includes receiving a download credit from the third communication device in response to transmitting the data to the third communication device, and transmitting the download credit to the first communication device.

A method of operating a communication device is provided. The method includes transmitting a caching request to a communication server system over a network, and transmitting first data to the communication server system for caching. The method also includes receiving a download credit from an external communication device, forwarded by the communication server system, each time the first data is transmitted to an external communication device by the communication server system. The method further includes transmitting the download credit and a request for second data to a remote communication device, and receiving the second data from the remote communication device.

A communication server system for operating a communication system is provided. The communication server system includes a communication interface communicatively coupled to a network, a storage system, and a processing system communicatively coupled to the communication interface and the storage system. The processing system is configured to monitor the network for communications exchanged between a first communication device and a second communication device for a transmission of data from the first communication device to the second communication device, and in response to detecting the transmission of the data, store a copy of the data in the storage system. The processing system is further configured to receive a request for the data from a third communication device through the communication interface, and in response to the request, transmit the data from the storage system to the third communication device. The processing system is also configured to receive a download credit from the third communication device through the communication interface in response to transmitting the data to the third communication device, and to transmit the download credit to the first communication device over the network.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
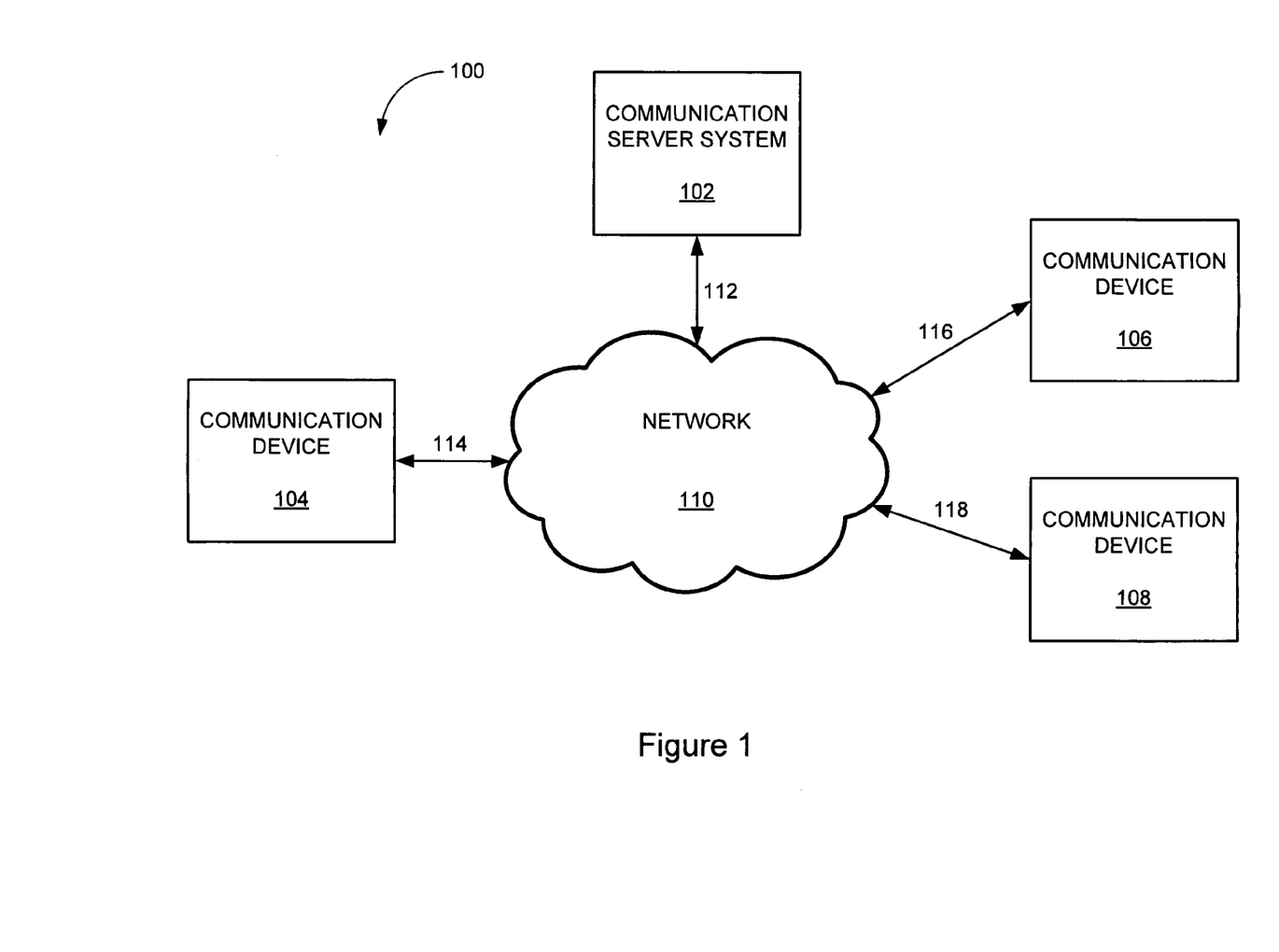
FIG. 1 is a block diagram illustrating a communication system.

FIG. 1 is a block diagram illustrating a communication system 100. This example communication system 100 includes communication server system 102, communication device 104, communication device 106, communication device 108, and network 110. Communication server system 102 is coupled to network 110 through link 112. Communication device 104 is coupled to network 110 through link 114, communication device 106 is coupled to network 110 through link 116, and communication device 108 is coupled to network 110 through link 118.

Communication devices 104, 106, and 108 may be any device configured to communicate with other devices over network 110. For example, communication devices 104, 106, and 108 could include telephones, smartphones, mobile phones, cellular phones, personal digital assistants (PDAs), personal communicators, handheld game consoles, personal computers (PCs), Ultra-Mobile personal computers (UMPCs), handheld televisions and any other consumer appliance with wireless communication capabilities.

Communication server system 102 may be any device capable of receiving data through network 110 from other devices, processing the data, and transmitting data through network 110 to other devices. For example, communication server system 102 may include a processing system for processing data, a communication interface for receiving and transmitting data, a storage system for storing data, and a user interface. One example embodiment of communication server system 102 is represented by the computer system illustrated in FIG. 6 and described in detail below.

Links 112, 114, 116, and 118 may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, code division multiple access, worldwide interoperability for microwave access, or any other communication protocols and formats, including combinations thereof. Further, the links could be direct links or they might include various intermediate components, systems, and networks.

In this example embodiment, a user of communication device 104 provides data. This data may be of any of a wide variety of formats, such as music, video, text, programming data, or the like. The data may be user-generated or otherwise provided by a user of communication device 104. A user of communication device 106 requests a copy of the data from communication device 104 through network 110. In response to this request, communication device 104 transmits a copy of the data to communication device 106 through network 110. Communication server system 102, which has been monitoring network 110 for such a transmission of data, stores a copy of the data.

When communication device 108 requests a copy of the data from communication device 104 through network 110, communication server system 102 intercepts this request and transmits the data to communication device 108. This caching of the data allows external communication devices to download the data without the use of communication device 104 or link 114. This caching is particularly useful in situations where link 114 from communication device 104 to network 110 is bandwidth limited. If link 112 has much greater bandwidth than link 114, the use of communication server system 102 as a cache of the data allows external devices to download the data at a much higher speed than would be possible if communication device 104 had to service their requests directly.

In some embodiments, such as a peer-to-peer (P2P) system, when a data file is downloaded, the owner of the data file receives a download credit for each download. These credits allow the owner of the data file to download other files from other users. This system is used to prevent people from joining the system only to download files, but never contributing their works for downloading. Download credits may take a variety of formats. For example, in some examples download credits may be randomly generated passwords or phrases allowing the subsequent download of one or more data files.

When communication server system 102 acts as a cache for the initial data file, each time it is downloaded the receiving device or system sends a download credit to communication server system 102. As long as communication device 104 and communication server system 102 share the same network this does not present a problem since communication server system 102 can provide the download credit to external systems when the user of communication device 104 wishes to download a data file. However, if communication device 104 moves to a different network, communication server system 102 may not be able to detect when communication device 104 is attempting a download, and thus may fail to provide the download credit necessary to allow the attempted download.

To prevent this problem, when communication server system 102 receives download credits from external devices that have downloaded data files from its cache, it determines the proper communication device to receive the credit and transmits the download credit to the proper communication device. This allows the communication device to use the download credit through any network, and it is no longer restricted to using the same network as communication server system 102.

Figure 2:
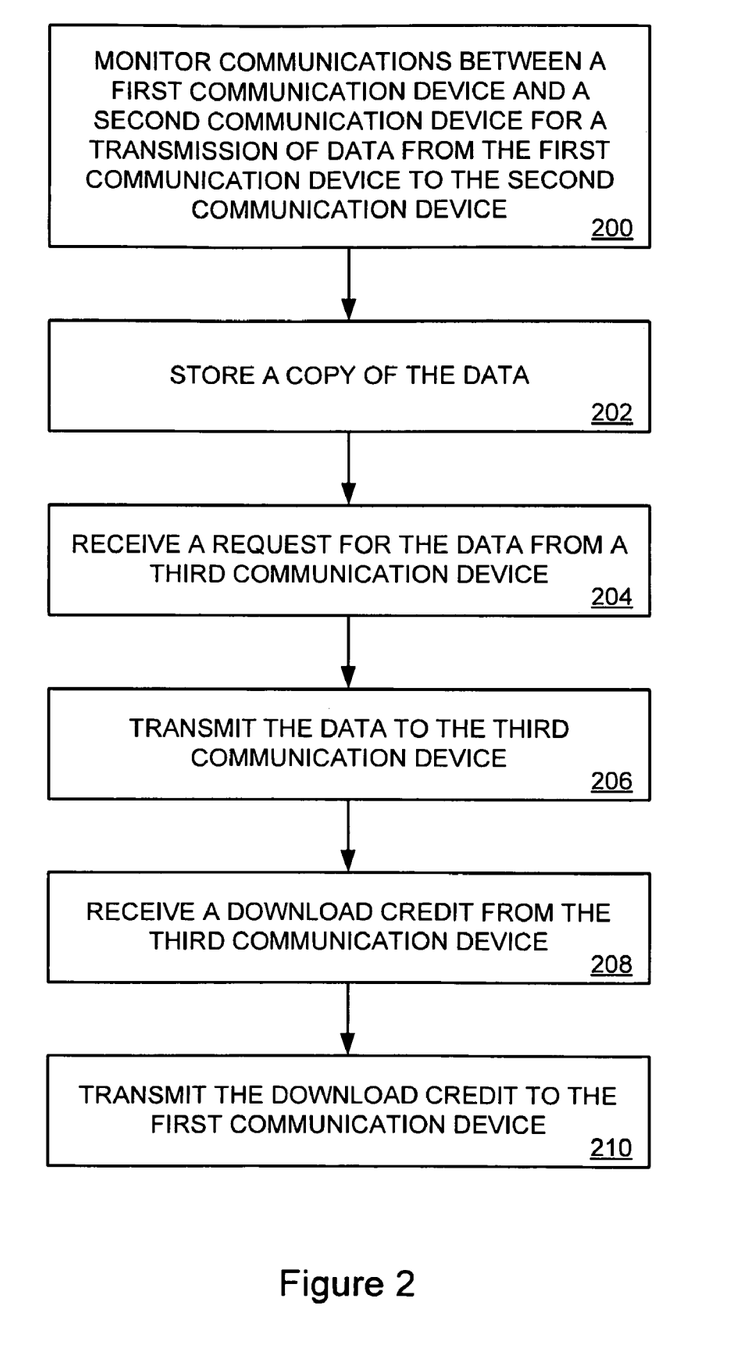
FIG. 2 is a flow chart illustrating a method for operating a communication server system within a communication system.

FIG. 2 is a flow chart illustrating a method for operating a communication server system 102 within a communication system 100. In this example method, communication server system 102 monitors communications between first communication device 104 and second communication device 106 for a transmission of data from first communication device 104 to second communication device 106 (operation 200). When communication server system 102 detects the transmission of data, it stores a copy of the data (operation 202).

When communication server system 102 subsequently receives a request for the data from third communication device 108 (operation 204), it then transmits the data to third communication device 108 (operation 206). Communication server system 102 then receives a download credit from third communication device 108 (operation 208), and then transmits the download credit to first communication device 104 (operation 210). This allows first communication device 104 to use the download credit when it is coupled with a network other than the one coupled with communication server system 102.

Figure 3:
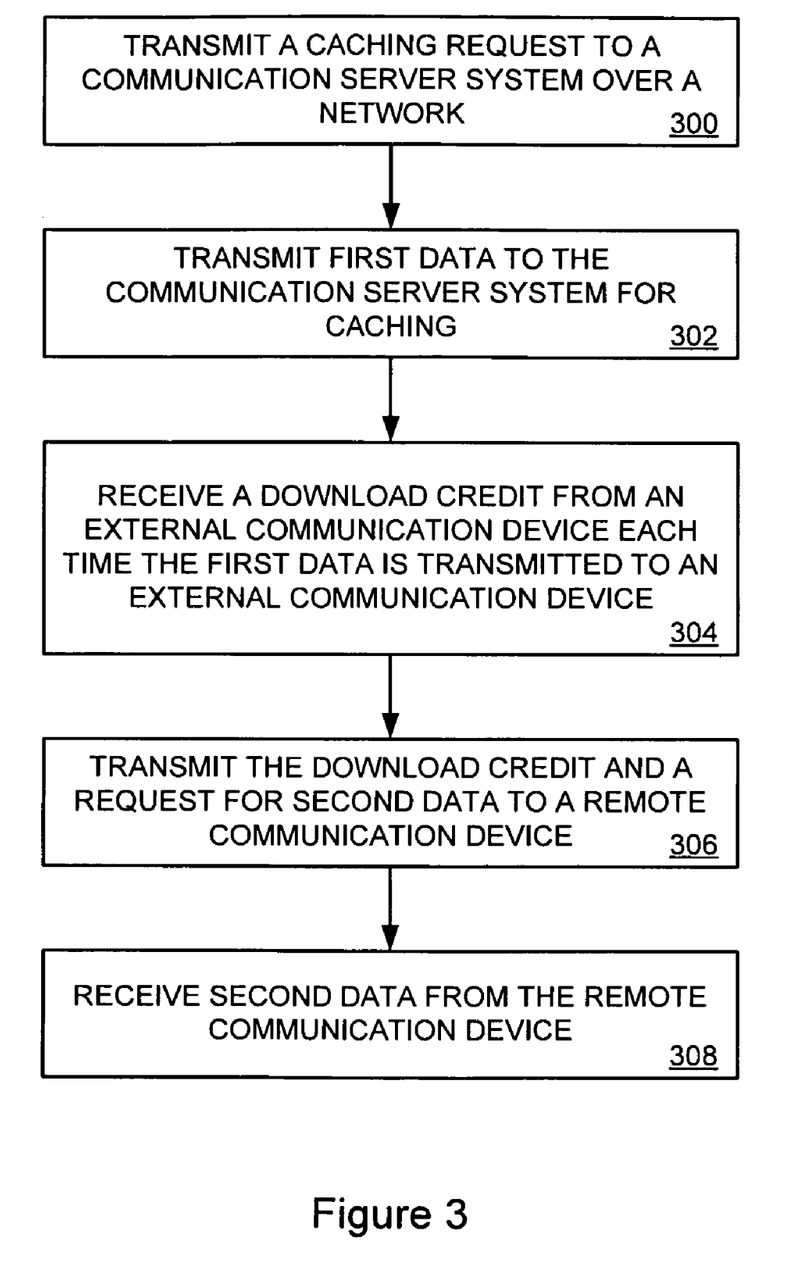
FIG. 3 is a flow chart illustrating a method for operating a communication device within a communication system.

FIG. 3 is a flow chart illustrating a method for operating a communication device 104 within a communication system 100. In this example, communication device 104 transmits a caching request to communication server system 102 over network 110 (operation 300). Communication device 104 then transmits first data to communication server system 102 for caching (operation 302).

Each time communication server system 102 transmits the first data to an external communication device, such as communication device 106, the external communication device responds with a download credit which is received by communication device 104 through communication server system 102 (operation 304). When a user of communication device 104 later wishes to download second data from a remote communication device, such as communication device 108, it transmits the download credit and a request for the second data to the remote communication device (operation 306). In response to the download credit and the request, communication device 104 receives the second data from the remote communication device (operation 308).

Figure 4:
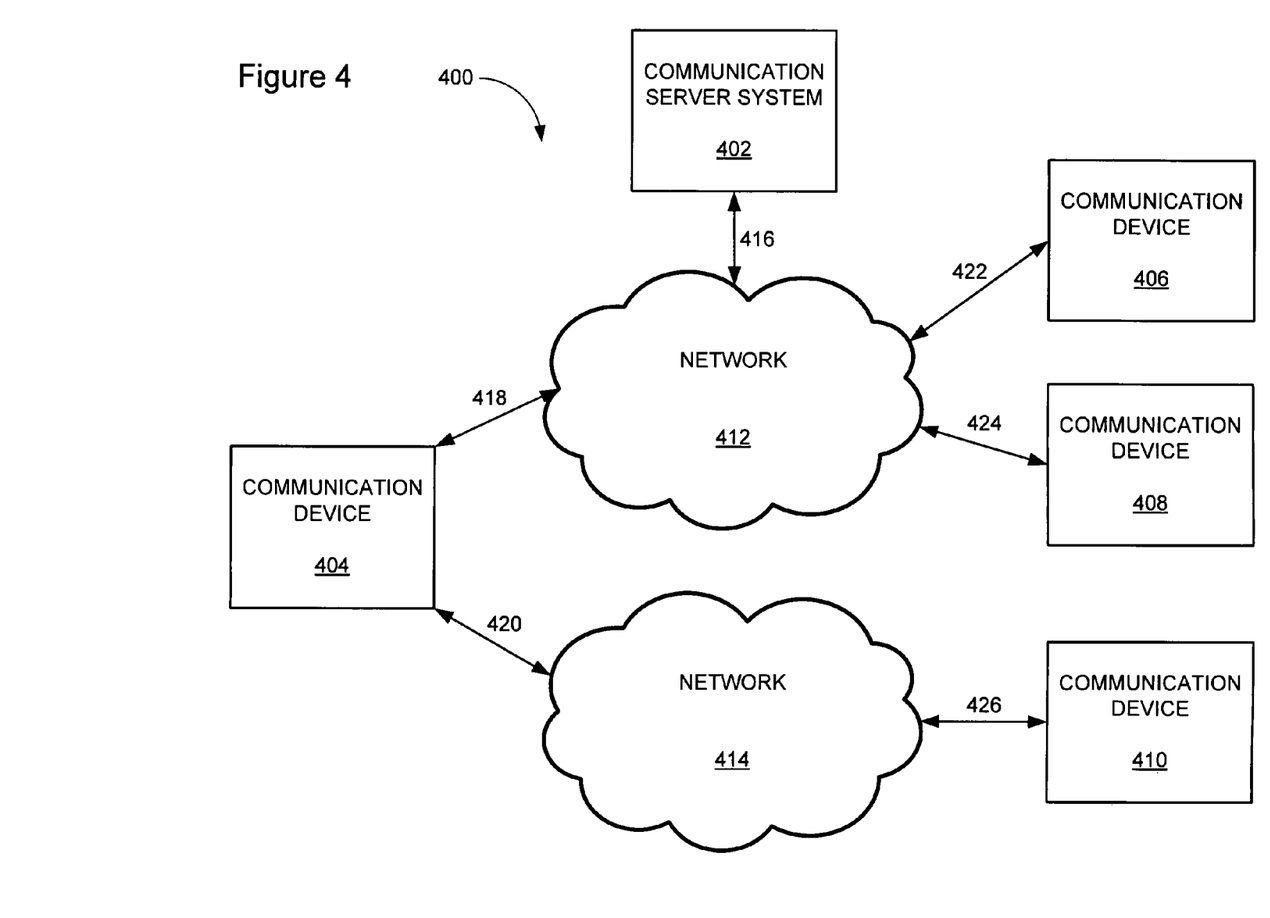
FIG. 4 is a block diagram illustrating a communication system.

FIG. 4 is a block diagram illustrating a communication system 400. This example communication system 400 is similar to that of FIG. 1, with the addition of a second network and a fourth communication device. In this example, communication system 400 includes communication server system 402, communication device 404, communication device 406, communication device 408, communication device 410, network 412, and network 414. Communication device 404 is coupled with network 412 through link 418 and with network 414 through link 420. Communication server system 402 is coupled with network 412 through link 416. Communication device 406 is coupled with network 412 through link 422. Communication device 408 is coupled with network 412 through link 424. Communication device 410 is coupled with network 414 through link 426.

Communication devices 404, 406, 408, and 410 may be any device configured to communicate with other devices over networks 412 and 414. For example, communication devices 404, 406, 408, and 410 could include telephones, smartphones, mobile phones, cellular phones, personal digital assistants (PDAs), personal communicators, handheld game consoles, personal computers (PCs), Ultra-Mobile personal computers (UMPCs), handheld televisions and any other consumer appliance with wireless communication capabilities.

Communication server system 402 may be any device capable of receiving data through network 412 from other devices, processing the data, and transmitting data through network 412 to other devices. For example, communication server system 402 may include a processing system for processing data, a communication interface for receiving and transmitting data, a storage system for storing data, and a user interface. One example embodiment of communication server system 402 is represented by the computer system illustrated in FIG. 6 and described in detail below.

Links 416, 418, 420, 422, 424, and 426 may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, code division multiple access, worldwide interoperability for microwave access, or any other communication protocols and formats, including combinations thereof. Further, the links could be direct links or they might include various intermediate components, systems, and networks.

In this example embodiment, a user of communication device 404 provides data. This data may be of any of a wide variety of formats, such as music, video, text, programming data, or the like. The data may be user-generated or otherwise provided by a user of communication device 404. A user of communication device 406 requests a copy of the data from communication device 404 through network 412. In response to this request, communication device 404 transmits a copy of the data to communication device 406 through network 412. Communication server system 402, which has been monitoring network 412 for such a transmission of data, stores a copy of the data.

When communication device 408 requests a copy of the data from communication device 404 through network 412, communication server system 402 intercepts this request and transmits the data to communication device 408. This caching of the data allows external communication devices to download the data without the use of communication device 404. This caching is particularly useful in situations where link 418 from communication device 404 to network 412 is bandwidth limited. If link 416 has much greater bandwidth than link 418, the use of communication server system 402 as a cache of the data allows external devices to download the data at a much higher speed than would be possible if communication device 404 had to service their requests directly.

In some embodiments, such as a peer-to-peer (P2P) system, when a data file is downloaded, the owner of the data file receives a download credit for each download. These credits allow the owner of the data file to download other files from other users. This system is used to prevent people from joining the system only to download files, but never contributing their works for downloading. Download credits may take a variety of formats. For example, in some examples download credits may be randomly generated passwords or phrases allowing the subsequent download of one or more data files.

When communication server system 402 acts as a cache for the initial data file, each time it is downloaded the receiving device or system sends a download credit to communication server system 402. As long as communication device 404 and communication server system 402 share the same network this does not present a problem since communication server system 402 can provide the download credit to external systems when the user of communication device 404 wishes to download a data file. However, when communication device 404 moves to network 414, communication server system 402 may not be able to detect when communication device 404 is attempting a download, and thus may fail to provide the download credit necessary to allow the attempted download.

To prevent this problem, when communication server system 402 receives download credits from external devices that have downloaded data files from its cache, it determines the proper communication device to receive the credit and transmits the download credit to the proper communication device. This allows the communication device to use the download credit through any network, and it is no longer restricted to using the same network as communication server system 402.

Thus when a user of communication device 404 requests a data file from communication device 410 over network 414, it sends a request for the data file along with a download credit to communication device 410. If all of the download credits for communication device 404 were stored on communication server system 402 on network 412, communication device 404 would be unable to download data from communication devices on network 414. The operation of communication system 400 is illustrated further in FIG. 5 and discussed below.

Figure 5:
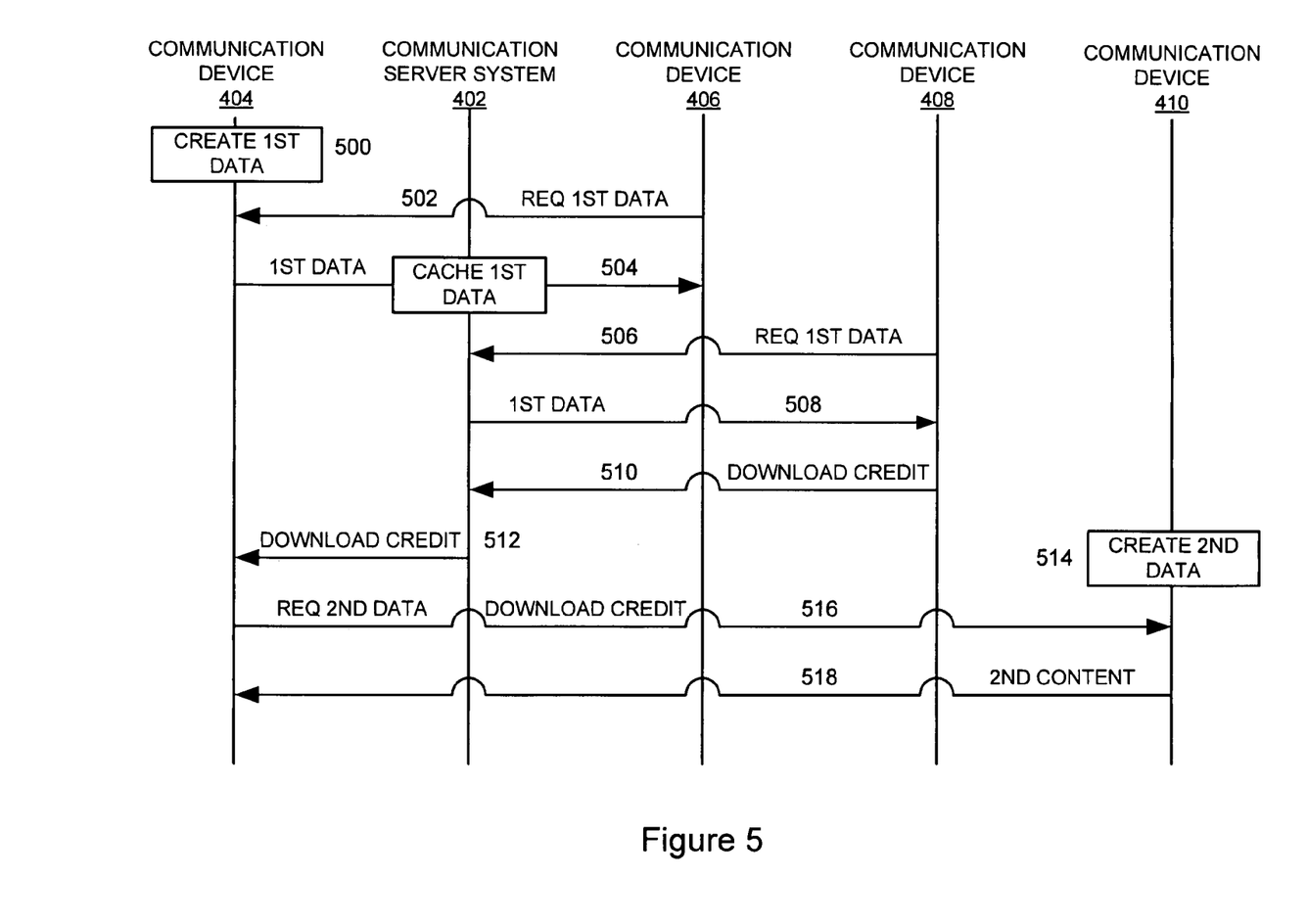
FIG. 5 is a flow diagram illustrating a method for operating a communication system.

FIG. 5 is a flow diagram illustrating a method for operating a communication system 400. In this example, a user of communication device 404 provides first data (operation 500). This first data may be of any of a wide variety of formats, such as music, video, text, programming data, or the like. The data may be user-generated or otherwise provided by a user of communication device 404. Communication device 406 then requests the first data from communication device 404 (operation 502). In response to this request, communication device transmits the first data to communication device 406 (operation 504). While this first data is transmitted to communication device 406, communication server system 402 caches the first data (operation 504).

When communication device 406 requests the first data (operation 506), this request is intercepted by communication server system 402 (operation 506). Communication server system 402 then transmits the first data to communication device 408 (operation 508). When communication device 408 has received the first data, it transmits a download credit to communication server system 402 (operation 510). Communication server system 402 then transmits the download credit to communication device 404 (operation 512).

A user of communication device 410 provides second data (operation 514). This second data may be of any of a wide variety of formats, such as music, video, text, programming data, or the like. The data may be user-generated or otherwise provided by a user of communication device 410. Communication device 404 then transmits a request for the second data and a download credit to communication device 410 (operation 516). In response to the request for the second data and the download credit, communication device 410 transmits the second data to communication device 404 (operation 518).

The methods, systems, devices, processors, equipment, and servers described above may be implemented with, contain, or be executed by one or more computer systems. The methods described above may also be stored on a computer readable medium for execution by a computer system. Many of the elements of communication systems 100 and 400 may be, comprise, or include computer systems. This includes, but is not limited to communication server system 102, communication devices 104, 106, and 108, communication server system 402, and communication devices 404, 406, 408, and 410. These computer systems are illustrated, by way of example, in FIG. 6.

Figure 6:
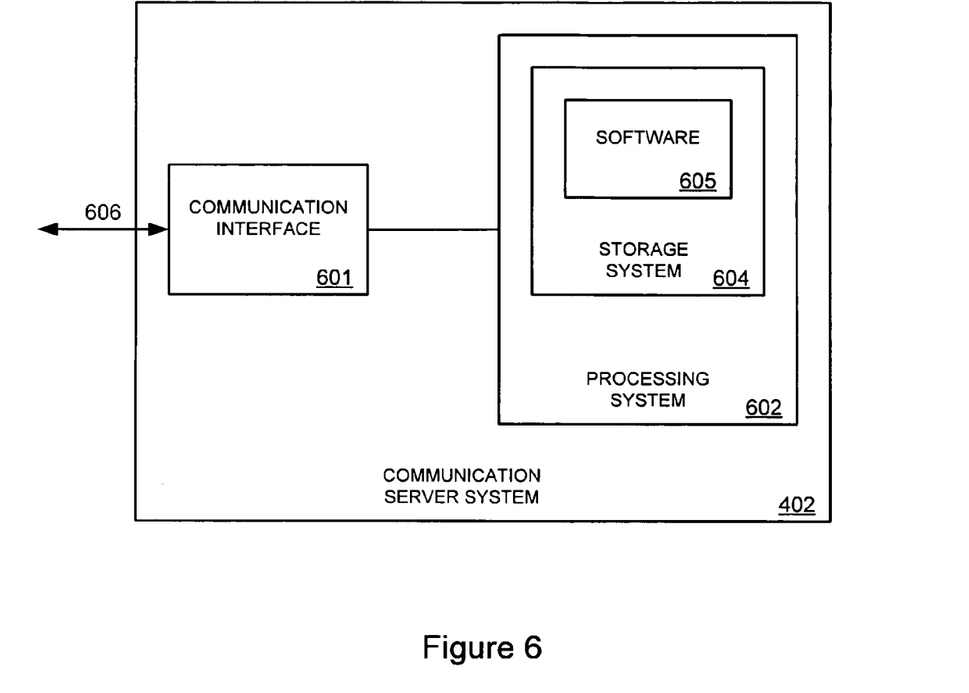
FIG. 6 is a block diagram illustrating a communication server system configured for operating a communication system.

FIG. 6 is a block diagram illustrating a computer system configured for operating a communication system. Computer system 600 includes communication interface 601 and processing system 602. Processing system 602 includes storage system 604. Storage system 604 stores software 605. Processing system 602 is linked to communication interface 601. Computer system 600 could be comprised of a programmed general-purpose computer, although those skilled in the art will appreciate that programmable or special purpose circuitry and equipment may be used. Computer system 600 may be distributed among multiple devices that together comprise elements 601-605.

Communication interface 601 could comprise a network interface, modem, port, transceiver, or some other communication device. Communication interface 601 is configured to exchange data with a network through link 606. Communication interface 601 may be distributed among multiple communication devices. Processing system 602 could comprise a computer microprocessor, logic circuit, or some other processing device. Processing system 602 may be distributed among multiple processing devices. Storage system 604 could comprise a disk, tape, integrated circuit, server, or some other memory device. Storage system 604 may be distributed among multiple memory devices.

Processing system 602 retrieves and executes software 605 from storage system 604. Software 605 may comprise an operating system, utilities, drivers, networking software, and other software typically loaded onto a computer system. Software 605 could comprise an application program, firmware, or some other form of machine-readable processing instructions. When executed by processing system 602, software 605 directs processing system 602 to operate as described herein, for example, as communication server systems 102 and 402.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication server system, the method comprising:
   monitoring communications exchanged between a first communication device and a second communication device for a transmission of data from the first communication device to the second communication device;
   in response to detecting the transmission of the data, storing a copy of the data;
   receiving a request for the data from a third communication device;
   in response to the request, transmitting the stored copy of the data to the third communication device;
   receiving a download credit from the third communication device in response to transmitting the data to the third communication device; and
   transmitting the download credit to the first communication device.

2. The method of claim 1 further comprising:
   receiving a caching request from the first communication device including an identification of the data; and
   receiving the data from the first communication device.

3. The method of claim 1 wherein the first communication device is a wireless communication device.

4. The method of claim 1 wherein the communications exchanged between the first communication device and the second communication device occur during a peer-to-peer session.

5. The method of claim 1 further comprising:
   creating a virtual machine, wherein the data is stored on the virtual machine.

6. The method of claim 1 wherein transmitting the data to the third communication device occurs during a peer-to-peer session.

7. The method of claim 1 wherein monitoring communications exchanged between the first communication device and the second communication device occurs over a wireless network.

8. A communication server system for operating a communication system, the communication server system comprising:
   a communication interface communicatively coupled to a network, wherein the communication interface is configured to exchange data with the network;
   a storage system; and
   a processing system communicatively coupled to the communication interface and the storage system;
   wherein the processing system is configured to:
   monitor the network for communications exchanged between a first communication device and a second communication device for a transmission of data from the first communication device to the second communication device;
   in response to detecting the transmission of the data, store a copy of the data in the storage system;
   receive a request for the data from a third communication device through the communication interface;
   in response to the request, transmit the stored copy of the data from the storage system to the third communication device;
   receive a download credit from the third communication device through the communication interface in response to transmitting the data to the third communication device; and
   transmit the download credit to the first communication device over the network.

9. The communication server system of claim 8 wherein the processing system is further configured to:
   receive a caching request from the first communication device including an identification of the data; and
   receive the data from the first communication device.

10. The communication server system of claim 8 wherein the first communication device is a wireless communication device.

11. The communication server system of claim 8 wherein the communications exchanged between the first communication device and the second communication device occur during a peer-to-peer session.

12. The communication server system of claim 8 wherein the processing system is also configured to create a virtual machine, and store the data on the virtual machine.

13. The communication server system of claim 8 wherein transmitting the data to the third communication device occurs during a peer-to-peer session.

14. The communication server system of claim 8 wherein monitoring communications exchanged between the first communication device and the second communication device occurs over a wireless network.

* * * * *